US009132521B2

(12) United States Patent
Chang

(10) Patent No.: US 9,132,521 B2
(45) Date of Patent: Sep. 15, 2015

(54) MAIN SHAFT STRUCTURE OF TOOL MACHINE

(75) Inventor: Richard Chang, Taichung (TW)

(73) Assignee: KINGSAND MACHINERY LTD., Taichung (TW)

( * ) Notice: Subject to any disclaimer, the term of this patent is extended or adjusted under 35 U.S.C. 154(b) by 710 days.

(21) Appl. No.: 13/444,084

(22) Filed: Apr. 11, 2012

(65) Prior Publication Data

US 2013/0269964 A1 Oct. 17, 2013

(51) Int. Cl.

| | |
|---|---|
| ***A01B 3/00*** | (2006.01) |
| ***A01B 5/08*** | (2006.01) |
| ***A01B 5/14*** | (2006.01) |
| ***B24B 7/07*** | (2006.01) |
| ***B27C 1/04*** | (2006.01) |

(52) U.S. Cl.
CPC .... *B24B 7/07* (2013.01); *B27C 1/04* (2013.01)

(58) Field of Classification Search
CPC ........ B26D 1/12; B27B 5/188; B23D 45/021; B23D 47/02; B23D 47/04; B24B 37/105; B24B 41/06; B24B 41/068; B27C 5/02; B23Q 1/25; B28D 1/046
USPC .......... 173/217; 482/51-61; 198/54, 840-848
See application file for complete search history.

(56) References Cited

U.S. PATENT DOCUMENTS

| | | | | |
|---|---|---|---|---|
| 3,818,648 | A * | 6/1974 | Evans | 451/451 |
| 4,427,042 | A * | 1/1984 | Mitchell et al. | 144/1.1 |
| 4,760,668 | A * | 8/1988 | Schlaefli | 451/56 |
| 5,513,709 | A * | 5/1996 | Fisher | 173/205 |
| 5,569,059 | A * | 10/1996 | Kirt | 451/5 |
| 5,794,675 | A * | 8/1998 | Garcia | 144/117.1 |
| 6,289,950 | B1 * | 9/2001 | Chiang | 144/117.1 |
| 2005/0233864 | A1 * | 10/2005 | Smith et al. | 482/52 |
| 2007/0258782 | A1 * | 11/2007 | Miyata et al. | 409/232 |
| 2008/0312048 | A1 * | 12/2008 | Cassano | 482/54 |
| 2009/0283286 | A1 * | 11/2009 | Hoffmann et al. | 173/215 |
| 2010/0300713 | A1 * | 12/2010 | Kume et al. | 173/4 |
| 2011/0180284 | A1 * | 7/2011 | Carrier et al. | 173/1 |
| 2011/0214551 | A1 * | 9/2011 | Chuang | 83/663 |
| 2011/0247466 | A1 * | 10/2011 | Weber | 83/13 |
| 2012/0000333 | A1 * | 1/2012 | Hatcher et al. | 83/52 |

* cited by examiner

*Primary Examiner* — Robert Long
(74) *Attorney, Agent, or Firm* — Raymond Y. Chan; David and Raymod Patent Firm

(57) ABSTRACT

A main shaft structure of a tool machine includes a base, a worktable, a motor fixing seat, a cutter seat, and a cutter wheel unit. The worktable is mounted on the base. The motor fixing seat is connected to one side of the base, and another side is connected with the cutter seat. Two ends of the cutter seat respectively have bearing recesses and first positioning portions close to the bearing recesses. The cutter wheel unit is coupled to the cutter seat. Two ends of the cutter wheel unit are provided with bearing seats which are placed into the bearing recesses. The bearing seats have second positioning portions to connect with the first positioning portions, so that the cutter wheel unit can be detached from the cutter seat quickly.

8 Claims, 6 Drawing Sheets

MAIN SHAFT STRUCTURE OF TOOL MACHINE

BACKGROUND OF THE INVENTION

1. Field of the Invention

The present invention relates to a tool machine.

2. Description of the Prior Art

A conventional polishing machine comprises a base which is provided with a convey belt at a predetermined upper position. One side of the base is provided with a motor unit which is used to drive an abrasive wheel of a cylinder unit to polish a workpiece. Two ends of the abrasive wheel have protruding spindles to be pivoted to bearing seats by means of bearings and buckle rings. One of the spindles is connected to a transmission wheel with an embedded-head screw. Because the bearing seats are respectively coupled to the frame of the polishing machine and the transmission wheel is wound by a belt or a chain, it is required to detach the belt, the transmission wheel and the bearing seats at the two ends in sequence when replacing the abrasive wheel. This replacement way is troublesome and takes a lot of time, and the labor cost in increases. Accordingly, the inventor of the present invention has devoted himself based on his many years of practical experiences to solve these problems.

SUMMARY OF THE INVENTION

The primary object of the present invention is to provide a main shaft structure of a tool machine. The cutter wheel unit of the tool machine can be detached from the tool machine quickly.

In order to achieve the aforesaid object, the main shaft structure of the tool machine comprises a base, a worktable, a motor fixing seat, a cutter seat, and a cutter wheel unit.

The worktable is mounted on the base. The worktable comprises a positioning board upright extending from a bottom thereof.

The motor fixing seat is upright connected to one side of the base. One side of the motor fixing seat is provided with a motor unit. The motor unit has an output axle. One end of the output axle is connected with a first connection member.

The cutter seat is connected to another side of the motor fixing seat opposite to the motor unit and located above the worktable. The cutter seat comprises a first casing board at one end thereof adjacent to the motor fixing seat, a second casing board at an opposing end thereof, two side casing boards connected between the first casing board and the second casing board, and an accommodation space defined between the first casing board, the second casing board and the two side casing boards. The first casing board and the second casing board respectively have bearing recesses and first positioning portions close to the bearing recesses.

The cutter wheel unit is coupled to the cutter seat. The cutter wheel unit is disposed in the accommodation space. The cutter wheel unit comprises an axial pivot axle. The pivot axle extends out of the cutter seat. Two ends of the pivot axle are provided with bearing seats. The bearing seats are placed into the bearing recesses. The bearing seats have second positioning portions corresponding to the first positioning portions. The first positioning portions are engaged with the second positioning portions. The pivot axle is provided with a second connection member corresponding to the first connection member of the motor unit. The second connection member is engaged with the first connection member so that the cutter wheel unit is driven by the motor unit.

Preferably, the first positioning portions of the cutter seat are threaded holes and the second positioning portions are through holes. A plurality of screws are inserted through the second positioning portions and screwed to the first positioning portions to secure the bearing seats on the cutter seat.

Preferably, the first connection member of the motor unit is a male tenon and the second connection member of the cutter wheel unit is a female mortise to engage with the first connection member.

Preferably, the first connection member has a central axial hole for insertion of the output axle. The first connection member has a plurality of threaded holes around a circumferential wall thereof. The threaded holes communicate with the axial hole. A plurality of fixing members are screwed to the threaded holes. The bottom ends of the fixing members are against a circumferential wall of the output axle so that the first connection member is connected to the output axle. When the fixing members are loosened, the bottom ends of the fixing members are not against the circumferential wall of the output axle so that the first connection member can be moved on the output axle.

Preferably, the bearing seats each have a bearing portion. The bearing portion has a stop block at one side thereof. The stop blocks of the bearing seats lean against the inner walls of the bearing recesses.

Preferably, the motor unit is a variable-speed motor.

Preferably, the two side casing boards of the cutting seat have two pairs of first adjustment holes. The two pairs of first adjustment holes are connected with two first limit members. The bottom ends of the two limit members are connected with two press rods. The two press rods are located above the worktable. The height of the limit members relative to the cutting seat is adjustable by different positions where the limit members are connected to the first adjustment holes.

Preferably, the worktable comprises the positioning board upright extending from its bottom thereof. The positioning board is attached to another side of the base opposite to the motor fixing seat. The positioning board has a plurality of second adjustment holes for engagement of a plurality of screws to be secured to the base. The second adjustment holes can be displaced on the screws and positioned by the screws so as to adjust the height of the worktable relative to the base. The side of the base, adjacent to the motor fixing seat, is provided with an adjustment unit. The adjustment unit comprises an adjustment rod. The adjustment rod leans against the underside of the worktable. The adjustment rod has a flat surface and a curved surface. One side of the adjustment rod is vertically connected with a pull handle. The pull handle brings rotation of the adjustment rod with the different surfaces to lean against the underside of the worktable to adjust the height of the worktable relative to the base.

Thereby, the cutter wheel unit of the present invention can be detached from the cutter seat quickly to enhance work efficiency and to save work time.

DETAILED DESCRIPTION OF THE PREFERRED EMBODIMENTS

Figure 1:
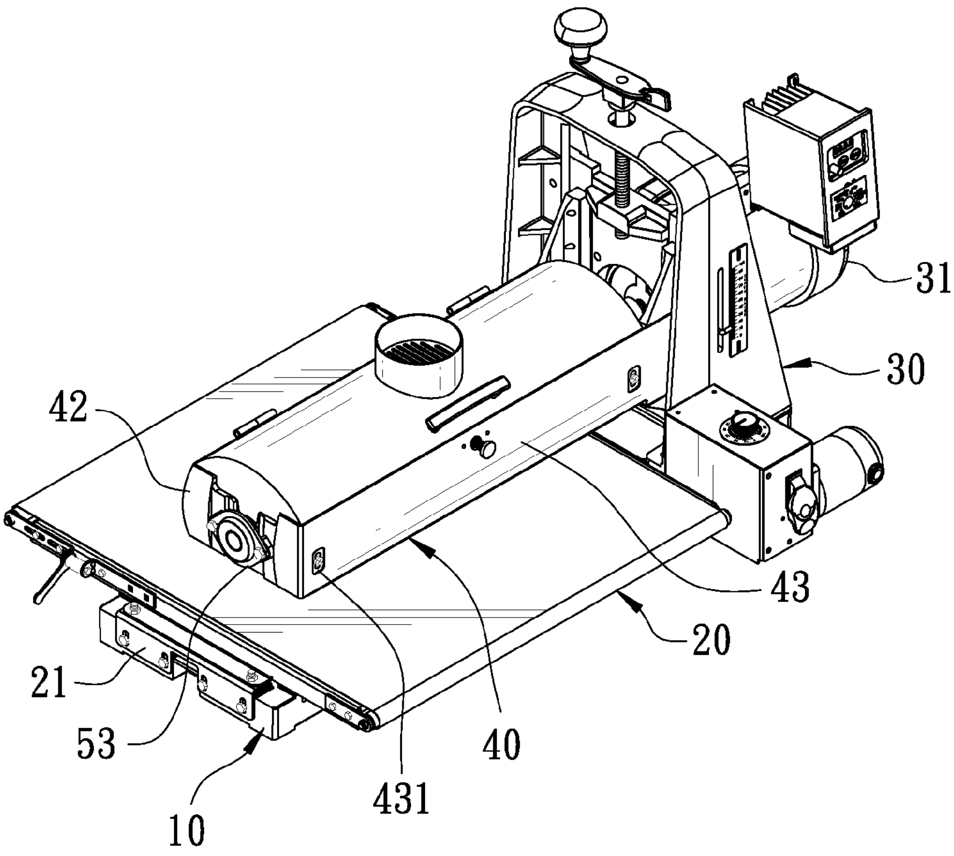
FIG. 1 is a perspective view according to a preferred embodiment of the present invention.
Figure 2:
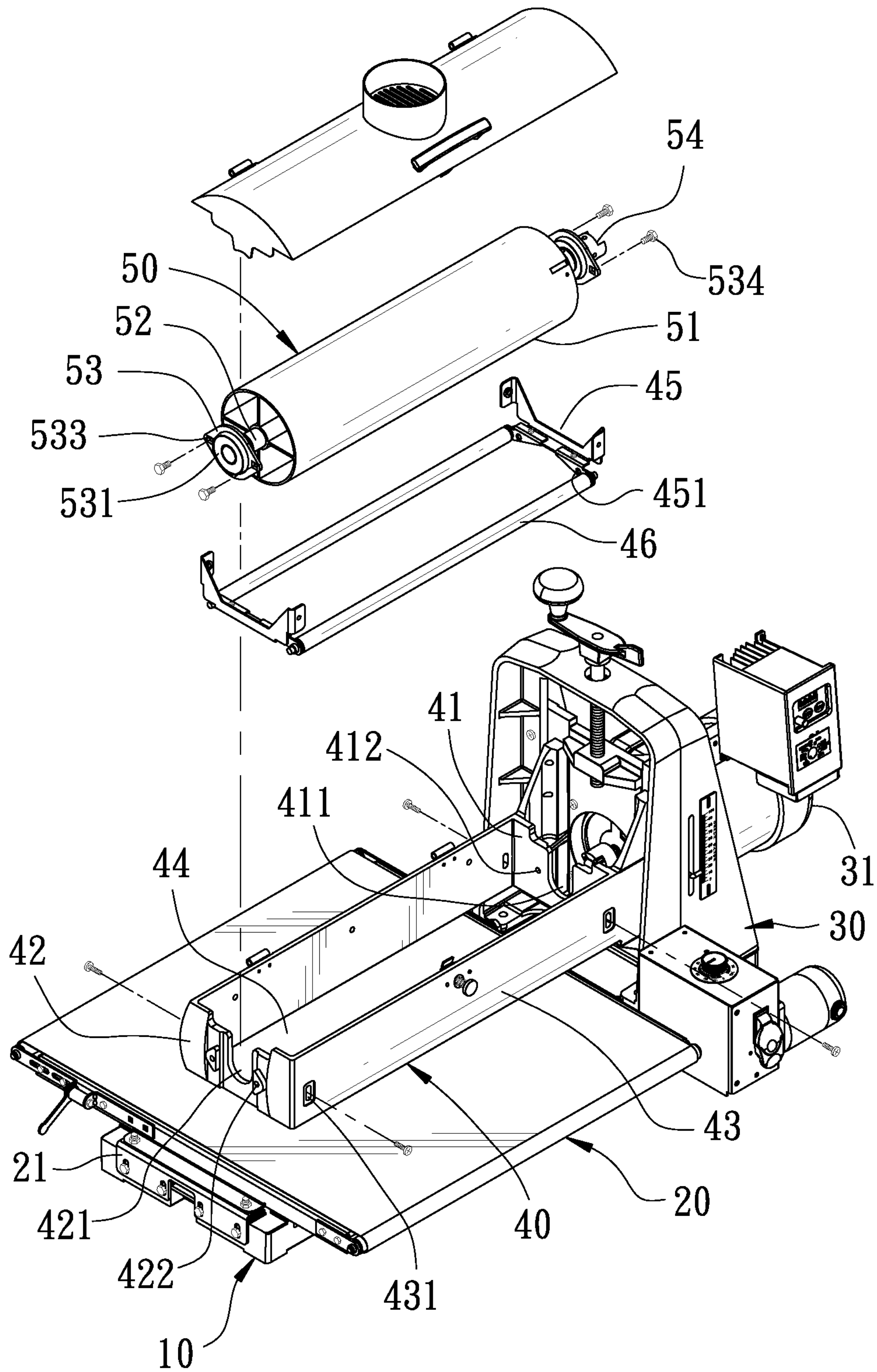
FIG. 2 is an exploded view according to the preferred embodiment of the present invention.

Embodiments of the present invention will now be described, by way of example only, with reference to the accompanying drawings.

As shown in FIG. 1 through FIG. 4, the main shaft structure of a tool machine according to a preferred embodiment of the present invention comprises a base 10, a worktable 20, a motor fixing seat 30, a cutter seat 40, and a cutter wheel unit 50.

The worktable 20 is mounted on the base 10. The worktable 20 comprises a positioning board 21 upright extending from a bottom thereof.

The motor fixing seat 30 is upright connected to one side of the base 10. One side of the motor fixing seat 30 is provided with a motor unit 31.

Figure 3:
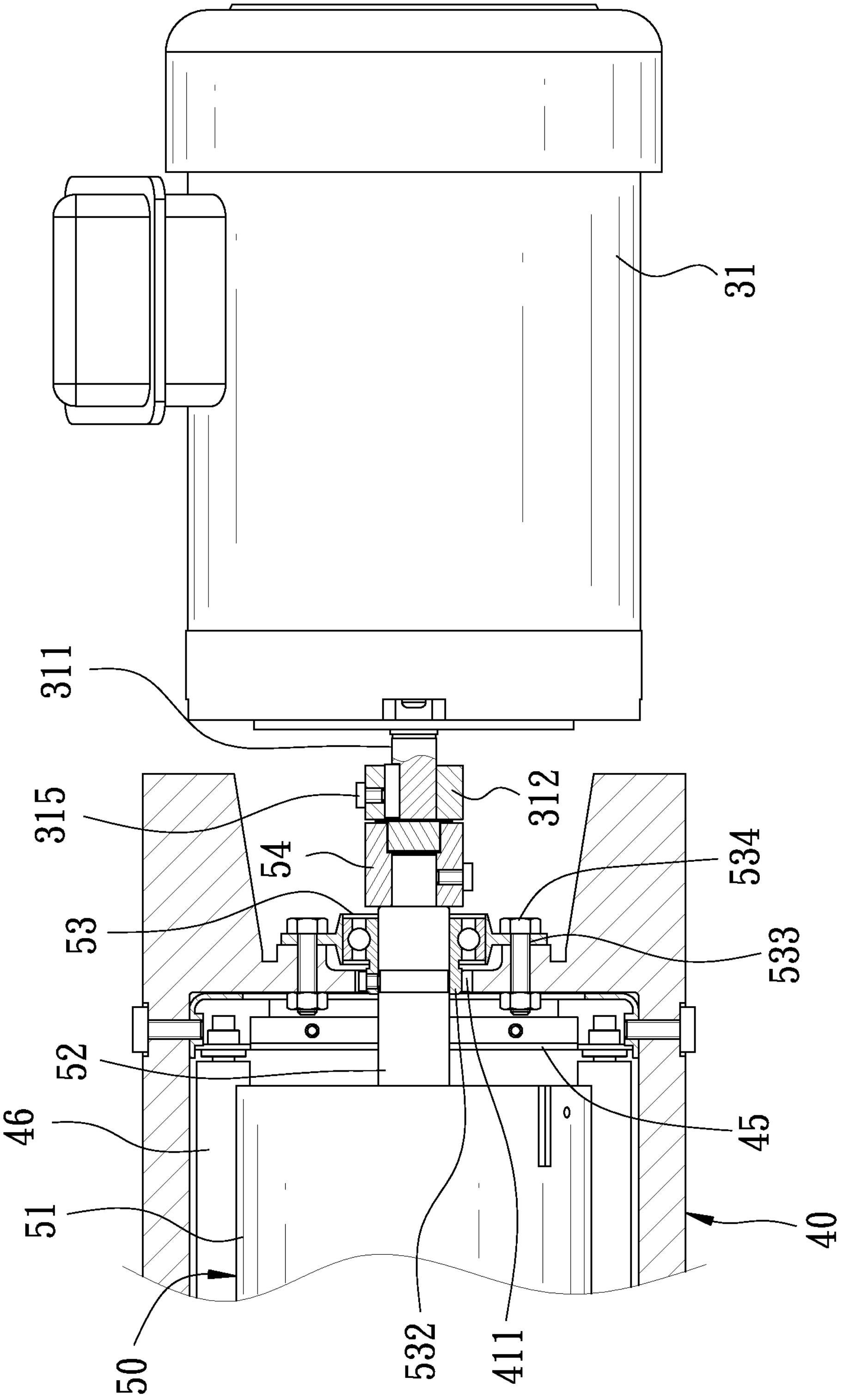
FIG. 3 is a partial enlarged sectional view according to the preferred embodiment of the present invention.
Figure 4:
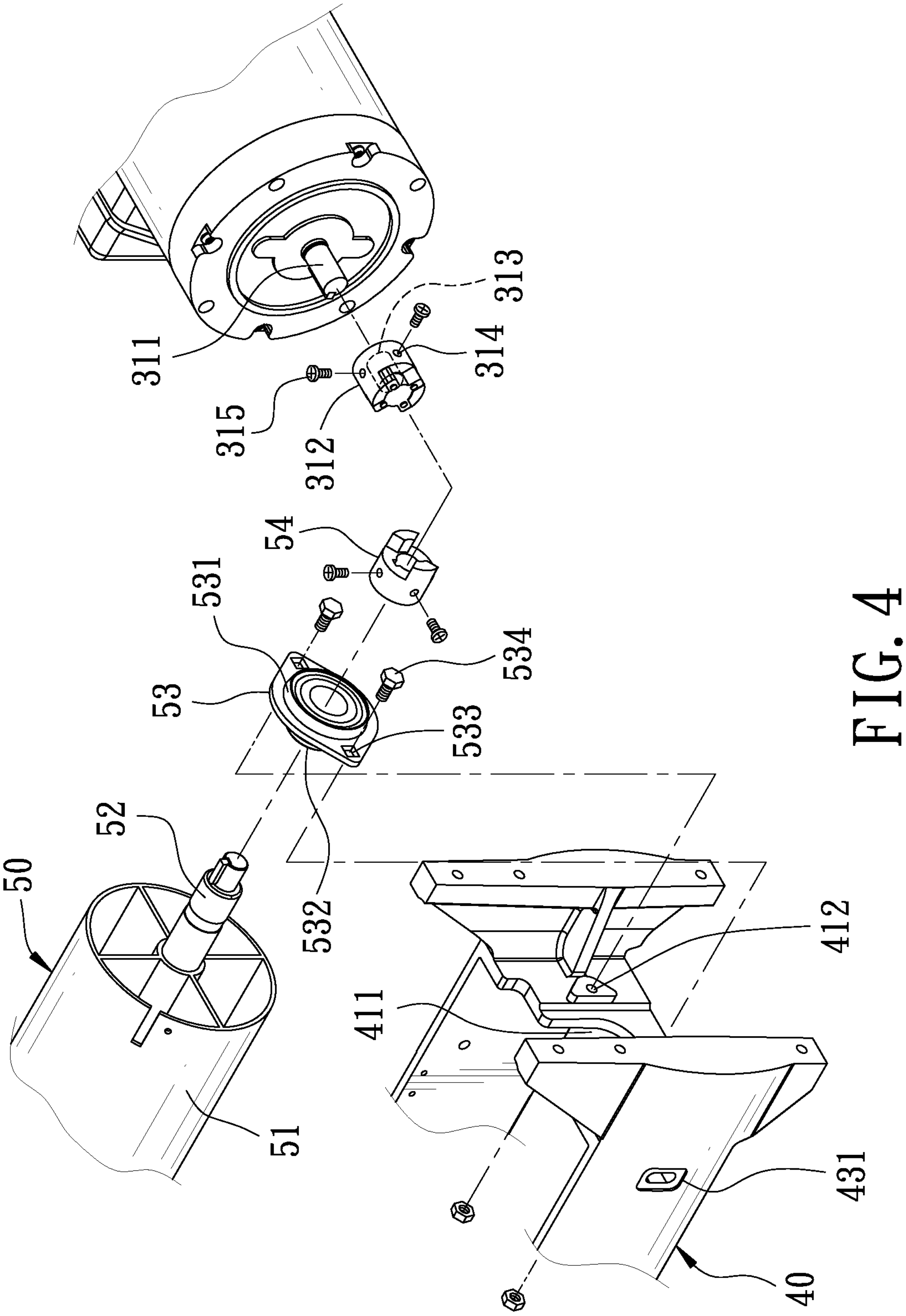
FIG. 4 is a partial enlarged exploded view according to the preferred embodiment of the present invention.

The motor unit 31 is a variable-speed motor which has different rotational speeds for cutting. As shown in FIG. 3 and FIG. 4, the motor unit 31 has an output axle 311. One end of the output axle 311 is connected with a first connection member 312. The first connection member 312 is a male tenon. In this embodiment, the first connection member 312 has a central axial hole 313 corresponding to the output axle 311, so that the output axle 311 is inserted and confined in the axial hole 313. The first connection member 312 has a plurality of threaded holes 314 around a circumferential wall thereof. The threaded holes 314 communicate with the axial hole 313. A plurality of fixing members 315 are screwed to the threaded holes 314. The bottom ends of the fixing members 315 hold against a circumferential wall of the output axle 311, such that the first connection member 312 is connected on the output axle 311. When the fixing members 315 are loosened, the bottom ends of the fixing members 315 are not against the circumferential wall of the output axle 313 so that the first connection member 312 can be moved on the output axle 311.

The cutter seat 40 is connected to another side of the motor fixing seat 30 opposite to the motor unit 31 and located above the worktable 20. The cutter seat 40 comprises a first casing board 41 at one end thereof adjacent to the motor fixing seat 30, a second casing board 42 at an opposing end thereof, two side casing boards 43 connected between the first casing board 41 and the second casing board 42, and an accommodation space 44 defined between the first casing board 41, the second casing board 42 and the two side casing boards 43. The first casing board 41 and the second casing board 42 respectively have bearing recesses 411, 421 and first positioning portions 412, 422 close to the bearing recesses 411, 421. In this embodiment, the first positioning portions 412, 422 are threaded holes. The two side casing boards 43 of the cutting seat 40 has two pairs of first adjustment holes 431 which are disposed close to the first casing board 41 and the second casing board 42. The two pairs of first adjustment holes 431 are connected with two first limit members 45. Each limit member 45 has two through holes 451 at a bottom thereof. The through holes 451 of the two limit members 45 are connected with two press rods 46. The two press rods 46 are located above the worktable 20. When a workpiece (not shown in the drawing) is polished on the worktable 20, the two press rods 46 hold the workpiece on the worktable 20. The distance between the two press rods 46 can be adjusted by the position of the through holes 451 for workpieces in different sizes. The height of the limit members 45 relative to the cutting seat 40 can be adjusted by different positions where the limit members 45 are connected to the first adjustment holes 431.

The cutter wheel unit 50 is coupled to the cutter seat 40. The cutter unit 50 comprises a cutter wheel 51 corresponding to the output axle 311. The cutter wheel 51 is disposed in the accommodation space 44. The cutter wheel 51 comprises an axial pivot axle 52. Two ends of the pivot axle 52 are provided with bearing seats 53. The bearing seats 53 are placed into the bearing recesses 411, 421 to be confined therein. As shown in FIG. 4, in this embodiment, each bearing seat 53 has a bearing portion 531. The bearing portion 531 has a stop block 532 at one side thereof close to the cutter wheel 51. The stop blocks 532 of the bearing seats 53 are used to lean against the inner walls of the bearing recesses 411, 421. The bearing portions 531 of the bearing seats 53 have second positioning portions 533 corresponding in number to the first positioning portions 412, 422. The second positioning portions 533 are through holes. A plurality of screws 534 are inserted through the second positioning portions 533 and screwed to the first positioning portions 412, 422 to secure the cutter wheel unit 50 on the cutter seat 40. The cutter wheel 51 can be turned relative to the bearing seats 53. One end of the pivot axle 52 is provided with a second connection member 54 corresponding to the first connection member 312 of the motor unit 31. In this embodiment, the second connection member 54 is a female mortise for engagement of the first connection member 312, so that the cutter wheel unit 50 is driven by the motor unit 31.

The bearing seats 53 of the cutter wheel unit 50 are placed in the bearing recesses 411, 412 of the cutter seat 40 to be positioned thereat, and the screws 534 are inserted through the second positioning portions 533 and screwed to the first positioning portions 412, 422 to secure the bearing seats 53 of the cutter wheel unit 50 on the cutter seat 40. The second connection member 54 of the cutter wheel unit 50 is connected with the first connection member 312 of the motor unit 31, so that the cutter wheel unit 50 is driven by the motor unit 31 to turn. When the user wants to detach the cutter wheel unit 50 from the cutter seat 40, the screws 534 which connect the cutter wheel 51 and the cutter seat 40 are first loosened and then the fixing members 315 on the first connection member 312 are loosened, so that the fixing members 315 are not against the circumferential wall of the output axle 311 and the first connection member 312 can be moved on the output axle 311 to form an operation space for detachment. Thus, the cutter wheel unit 50 of the present invention can be detached from the cutter seat 40 quickly to enhance the assembly efficiency and to save work time.

Figure 5:
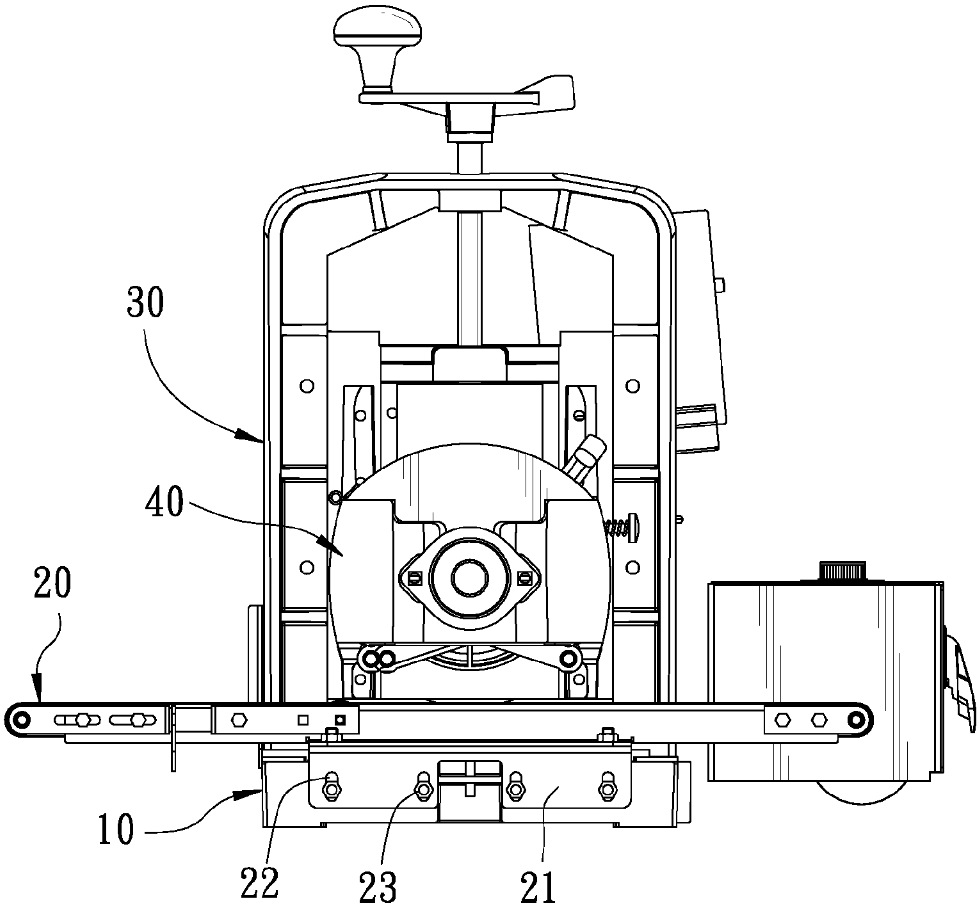
FIG. 5 is a side view according to the preferred embodiment of the present invention.
Figure 6:
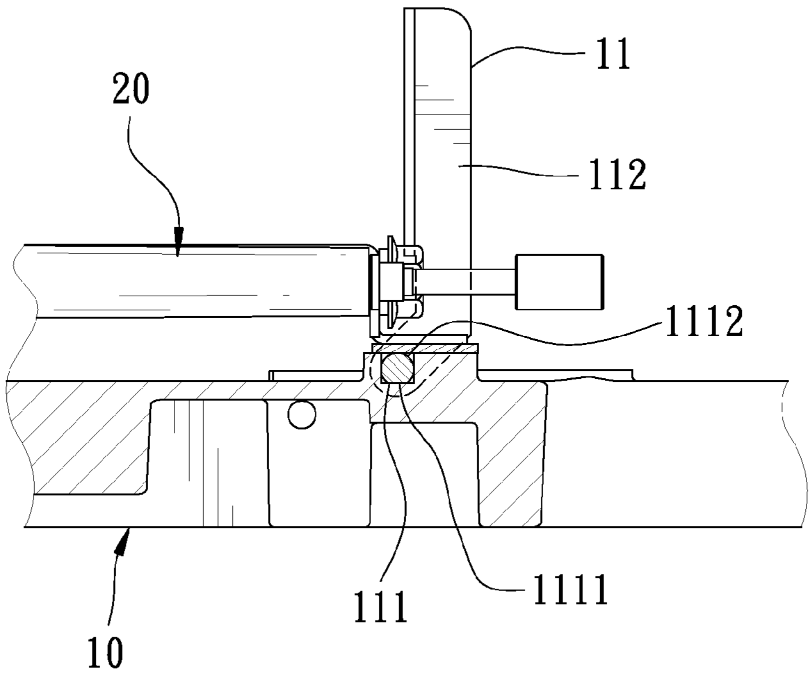
FIG. 6 is a schematic view of the preferred embodiment of the present invention when in use.
Figure 7:
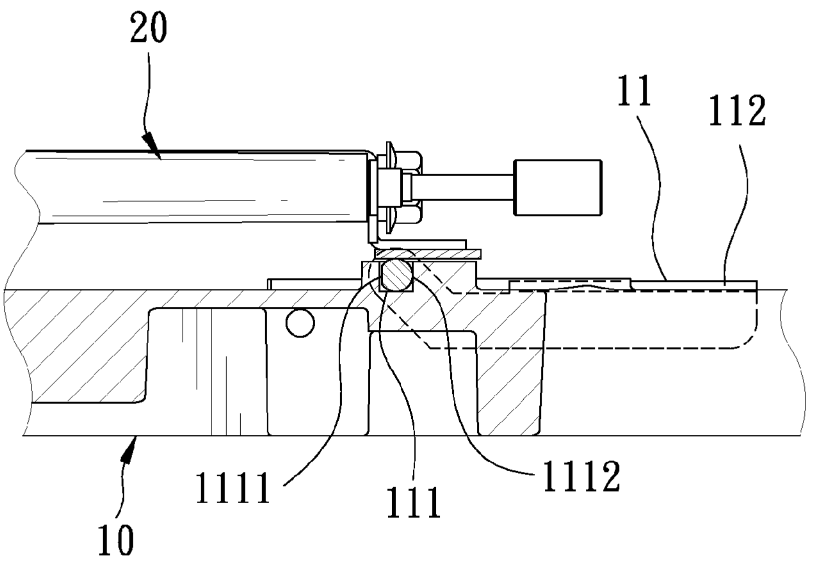
FIG. 7 is another schematic view of the preferred embodiment of the present invention when in use.

FIG. 5 is a side view of the preferred embodiment of the present invention. The worktable 20 comprises the positioning board 21 upright extending from the bottom thereof. The positioning board 21 is attached to another side of the base 10 opposite to the motor fixing seat 30. The positioning board 21 has a plurality of second adjustment holes 22 for engagement of a plurality of screws 23 to be secured to the side of the base 10. The adjustment holes 22 can be displaced on the screws 23 and positioned by the screws 23 so as to adjust the height of the worktable 20 relative to the base 10. FIG. 6 is a schematic view of the preferred embodiment of the present invention when in use. FIG. 7 is another schematic view of the preferred embodiment of the present invention when in use. The side of the base 10, adjacent to the motor fixing seat 30, is provided with an adjustment unit 11. The adjustment unit 11 comprises an adjustment rod 111. The adjustment rod 111 leans against the underside of the worktable 20. The adjustment rod 111 has a flat surface 1111 and a curved surface 1112. One side of the adjustment rod 111 is vertically connected with a pull handle 112. The pull handle 112 brings rotation of the adjustment rod 111 with the different surfaces to lean against the underside of the worktable 20, so that the adjustment rod 111 can have different height differences under the worktable 20 to adjust the height of the worktable 20 relative to the base 10.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A main shaft structure of a polishing machine for polishing a workpiece, comprising:

a base;

a worktable mounted on the base for supporting the workpiece on the worktable, wherein a height of the worktable is adjustable relative to the base;

a motor fixing seat upright connected to one side of the base, one side of the motor fixing seat being provided with a motor unit, the motor unit having an output axle, one end of the output axle being connected with a first connection member;

a cutter seat connected to another side of the motor fixing seat opposite to the motor unit and located above the worktable, the cutter seat comprising a first casing board at one end thereof adjacent to the motor fixing seat, a second casing board at an opposing end thereof, two side casing boards connected between the first casing board and the second casing board, and an accommodation space defined between the first casing board, the second casing board and the two side casing boards, the first casing board and the second casing board respectively having bearing recesses and first positioning portions close to the bearing recesses; and a cutter wheel unit coupled to the cutter seat, the cutter wheel unit being disposed in the accommodation space, the cutter wheel unit comprising a cutter wheel, which is arranged for polishing the workpiece, wherein the cutter wheel comprises an axial pivot axle, the pivot axle extending out of the cutter seat, two ends of the pivot axle being provided with bearing seats, the bearing seats being placed into the bearing recesses, the bearing seats having second positioning portions corresponding to the first positioning portions, the first positioning portions being engaged with the second positioning portions, the pivot axle being provided with a second connection member corresponding to the first connection member of the motor unit, the second connection member being engaged with the first connection member in such a manner that the pivot axle of the cutter wheel is coaxially arranged with the output axle of the motor unit, so that the cutter wheel unit is driven by the motor unit.

2. The main shaft structure of a polishing machine as claimed in claim 1, wherein the first positioning portions of the cutter seat are threaded holes and the second positioning portions are through holes, a plurality of screws being inserted through the second positioning portions and screwed to the first positioning portions to secure the bearing seats on the cutter seat.

3. The main shaft structure of a polishing machine as claimed in claim 1, wherein the first connection member of the motor unit is a male tenon and the second connection member of the cutter wheel unit is a female mortise to engage with the first connection member.

4. The main shaft structure of a polishing machine as claimed in claim 3, wherein the first connection member has a central axial hole for insertion of the output axle, the first connection member having a plurality of threaded holes around a circumferential wall thereof, the threaded holes communicating with the axial hole, a plurality of fixing members screwed to the threaded holes, bottom ends of the fixing members holding against a circumferential wall of the output axle so that the first connection member is connected to the output axle, wherein when the fixing members are loosened, the bottom ends of the fixing members are not against the circumferential wall of the output axle so that the first connection member is able to be moved on the output axle, so as to allow the cutter wheel unit to be detached from the cutter seat.

5. The main shaft structure of a polishing machine as claimed in claim 1, wherein the bearing seats each have a bearing portion, the bearing portion having a stop block at one side thereof, the stop blocks of the bearing seats leaning against inner walls of the bearing recesses.

6. The main shaft structure of a polishing machine as claimed in claim 1, wherein the motor unit is a variable-speed motor.

7. The main shaft structure of a polishing machine as claimed in claim 1, wherein the two side casing boards of the cutting seat has two pairs of first adjustment holes, the two pairs of first adjustment holes being connected with two first limit members, bottom ends of the two limit members being connected with two press rods, the two press rods being located above the worktable, the height of the limit members relative to the cutting seat being adjustable by different positions where the limit members are connected to the first adjustment holes.

8. The main shaft structure of a polishing machine as claimed in claim 1, wherein the worktable comprises a positioning board upright extending from a bottom thereof, the positioning board is attached to another side of the base opposite to the motor fixing seat, the positioning board having a plurality of second adjustment holes for engagement of a plurality of screws to be secured to the base, the second adjustment holes can be displaced on the screws and positioned by the screws so as to adjust the height of the worktable relative to the base, the side of the base adjacent to the motor fixing seat being provided with an adjustment unit, the adjustment unit comprising an adjustment rod, the adjustment rod leaning against an underside of the worktable, the adjustment rod having a flat surface and a curved surface, one side of the adjustment rod being vertically connected with a pull handle, the pull handle bringing rotation of the adjustment rod with the different surfaces to lean against the underside of the worktable to adjust the height of the worktable relative to the base.

* * * * *